Nov. 29, 1960     J. W. BROWN, JR., ET AL     2,961,749
METHOD AND APPARATUS FOR BRAZING FINS TO TUBES
Filed Feb. 16, 1955     2 Sheets-Sheet 1

INVENTORS.
JOHN W. BROWN, JR.
ARVID C. K. NIHLEN

BY

ATTORNEYS.

Nov. 29, 1960  J. W. BROWN, JR., ET AL  2,961,749
METHOD AND APPARATUS FOR BRAZING FINS TO TUBES
Filed Feb. 16, 1955  2 Sheets-Sheet 2

INVENTORS.
JOHN W. BROWN, JR.
ARVID C.K. NIHLEN
BY
ATTORNEYS.

United States Patent Office 2,961,749
Patented Nov. 29, 1960

2,961,749

METHOD AND APPARATUS FOR BRAZING FINS TO TUBES

John W. Brown, Jr., Lakewood, and Arvid C. K. Nihlen, Oberlin, Ohio, assignors to Brown Fintube Company, Elyria, Ohio, a corporation of Ohio Filed Feb. 16, 1955, Ser. No. 488,560

16 Claims. (Cl. 29—157.3)

This invention relates to the manufacture of heat exchanger tubes with internal fins and more particularly to a method and apparatus for bonding longitudinally extending fins to the inside of heat exchanger tubes by means of a bonding metal that is fused in the bonding operation. This type of bonding is hereinafter referred to as "brazing," and the term "brazing" as used herein is intended to cover bonding methods ordinarily known as soldering, silver soldering, brazing, copper brazing, hydrogen brazing, and the like.

Internally finned heat exchanger tubes are desirable for many purposes, but heretofore it has been so difficult and expensive to manufacture such tubes, particularly in smaller sizes, that their use has been relatively limited. It has been proposed to braze channel section fin members to the interior of tubes, but in most instances the brazing operations have been carried out with great difficulty, and great care has been required to obtain good brazed connections between the fin members and the tubes throughout the length of the fin members.

In order to provide a good brazed connection, it is necessary that the surfaces to be joined together be firmly in contact with each other at the time that the brazing heat is applied. To hold the fin members in contact with the inside surfaces of a tube during a brazing operation is a difficult matter, particularly with smaller diameter tubes; and the difficulty is increased by the fact that the dimensions of the fin members may not be held with a great degree of accuracy and furthermore, the tubing may not be of uniform diameter throughout. Seamless tubing, which is used widely in heat exchangers, ordinarily is slightly oval rather than round in cross-section, and the major diameter of the oval does not remain in one plane but usually rotates along the length of the tube. Thus, the diameter of the tube in a given plane may vary substantially, and the result of this is that a longitudinal element of the tube is not a straight line but is an undulating or curved line.

A straight longitudinal fin cannot be successfully brazed to such a surface throughout the contacting area of the fin and tube unless the fin is deformed slightly, so that it conforms to and makes firm contact with the undulating inner surface of the tube. The difficulty of holding the fins in place against the tube is, of course, increased if the fins themselves are inaccurate.

According to the present invention, the difficulties with prior methods and apparatus are eliminated, and a method and apparatus whereby fins may be rapidly and effectively brazed or soldered to the inner surface of heat exchanger tubes is provided by supporting a group of channel-section fin members against the interior surface of the tube by means of a resilient metal member which is composed of a plurality of convolutions which are spaced along the length of the fin members and which have the property of expanding and contracting more or less independently of each other, so that the fin members are urged firmly into contact with the inner surface of the tube regardless of reasonable variations in tube diameter and dimensions of the fin member. Such a member in its simplest and preferred form comprises a coil spring. In carrying out the method, the coil spring is stretched to contract it diametrically; a group of channel-section fin members are disposed circumferentially about the spring and temporarily held in position either manually or by appropriate fixtures; and then a tube, which previously has been cleaned internally, is slipped over the assembly of fin members and spring.

Thereafter, the tension on the spring is released so that the convolutions of the spring expand radially outwardly, engage the inner surfaces of the fin members and force the outer surfaces of the fin members into firm engagement with the inner surface of the tube. Preferably, the portions of the fin members that engage the tube are tinned with the bonding metal before assembly with the tube, and flux is supplied to the surfaces. The assembly, with the spring holding the fin members in position, is then heated, for example, by passing the tube through a ring-like burner to progressively heat and fuse the bonding metal. Upon cooling and solidification of the bonding metal, the fin members are firmly bonded to the inner surface of the tube throughout their contact areas. Thereafter, the spring may be elongated to contract it diametrically and then removed from the tube, or the spring may be left within the tube if desired.

Referring to the drawings, Figure 1 illustrates a preferred form of tube made according to my invention.

Figure 4:
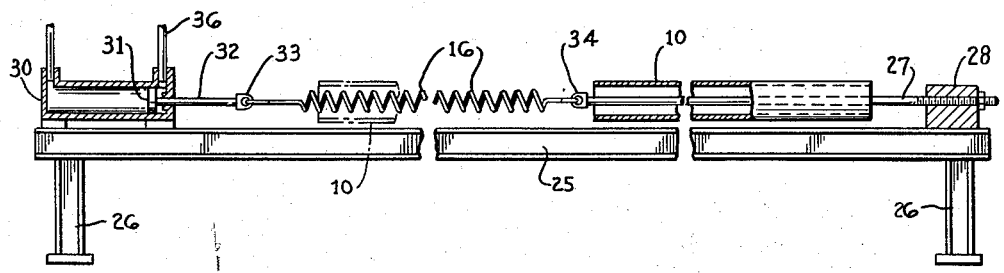

Figure 4 diagrammatically illustrates an apparatus suitable for elongating the spring and inserting the assembly of spring and fin members within the tube.

Figure 5:
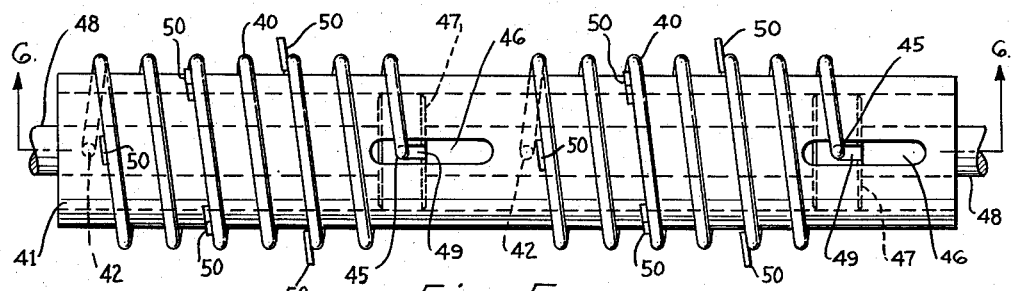
Figure 6:
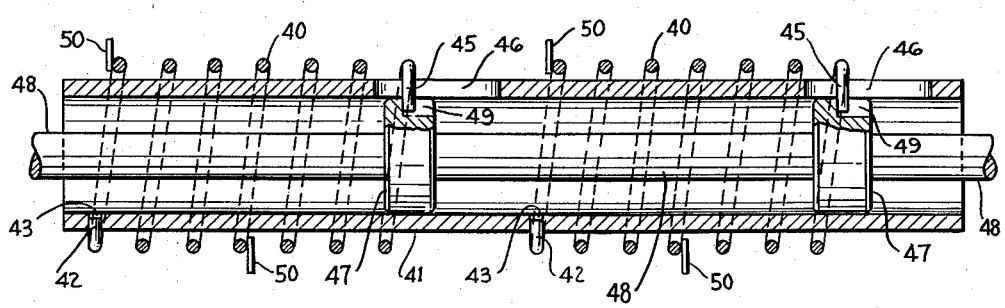

Figure 5 is an elevational view of a modified form of support for the fin members, and Figure 6 is a longitudinal sectional view taken as indicated by line 6—6 of Figure 5.

Figure 1:
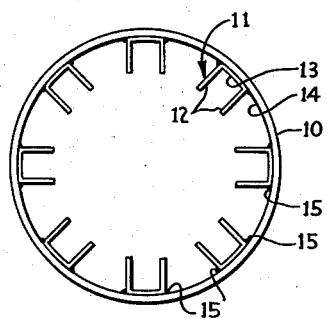

As shown in Figure 1, a heat exchanger tube embodying our invention may comprise a tube 10 to the interior surface of which a plurality of channel-section fin members 11 are secured. Each fin member comprises a pair of fins 12 and a base portion 13, the base portion being brazed or soldered to the inner surface 14 of the tube 10. The fin members extend generally longitudinally of the tube and thus provide extended heat exchange surface without seriously increasing the resistance to flow of fluids through the tube. The brazed connection between the bases 13 of the fin members 11 and the inner surface 14 of the tube provides a metallic path of substantial area between each member and the tube and thus insures efficient transfer of heat between the fin members and the tube. As shown in Figure 1, it is possible to carry out the brazing operation so that fillets 15 are formed, thus providing larger paths for heat transfer between the fin bases and the tube. The tubes have high heat exchange capacity per unit of length as compared to unfinned tubes and, accordingly, are extremely useful in the construction of heat exchangers.

Figure 2:
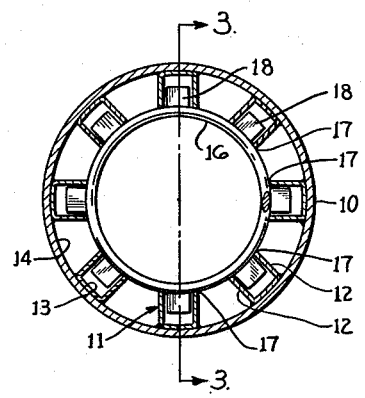
Figure 2 is a transverse section throughout the tube of Figure 1, showing the fin members and spring in place therein preparatory to brazing.
Figure 3:
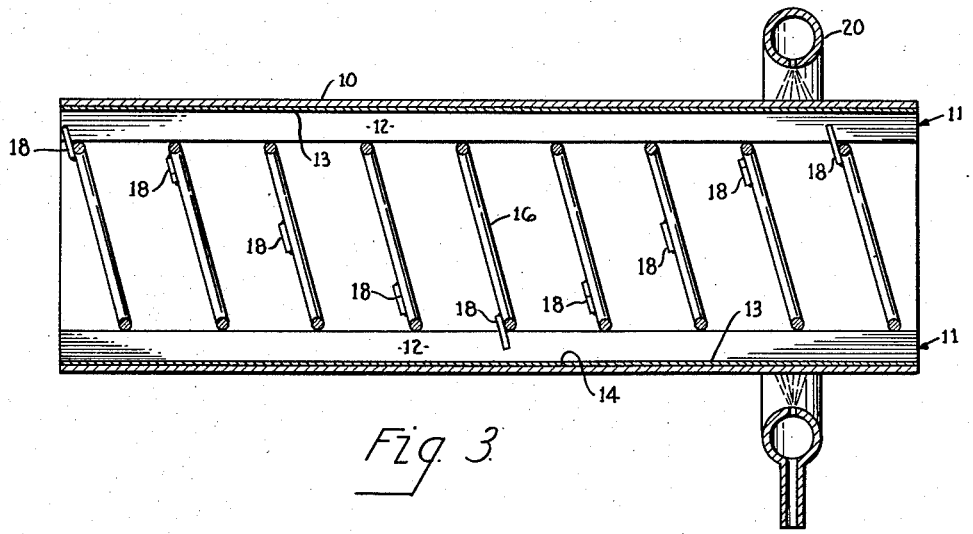
Figure 3 is a longitudinal section taken as indicated by line 3—3 of Figure 2.

Figures 2 and 3 somewhat diagrammatically illustrate a method and apparatus employed for brazing the fin members 11 to the inner surface 14 of the tube 10. The brazing operation is accomplished by holding the fin members in firm engagement with the inner surface of the tube by means of a coil spring 16, each convolution of which, as shown in Figures 2 and 3, engages the inner edges 17 of the fins 12. The spring preferably has guide lugs or tongues 18 welded to it, the lugs being longitudinally spaced along the spring in rows that are circumferentially spaced to conform to the desired circumferential spacing of the fin members.

The normal diameter of the spring 16 is greater than the normal diameter of the circle defined by the inner edges 17 of the fin members; as explained above, the spring is stretched to enable the assembly of fin members and spring to be inserted within the tube. When the spring is released, each convolution endeavors to expand to its normal diameter and in so doing, engages and urges the fin members outwardly against the internal surface of the tube. The entire spring is resilient, so that the convolutions can seat themselves more or less independently within the assembly of fin members and tube. One convolution can be offset slightly from an adjacent convolution, if that is necessary for proper seating. Furthermore, the convolutions can expand to varying degrees and thus, within reasonable limits, can expand to compensate for variations in the diameter of the tube or variations in dimensions of the fin members. The convolutions also can take slightly oval, elliptical, or other out-of-round shapes in conformation to the inner edges of the fins and, hence, can urge all parts of the fins outwardly into engagement with the inner surface of the tube.

In effect, the spring provides outwardly acting forces which, within the tolerances ordinarily found in heat exchanger tubing and with reasonable accuracy in the manufacture of the fin members, can be considered as essentially independent of each other. Thus, wherever the spring member 16 engages the inner edge 17 of a fin, it forces the fin member outwardly and provides the contact needed for successful brazing regardless of the usual variations found in commercial tubing and in the fin members.

The brazing can be carried out in various manners. The entire assembly of tube, fin members and spring can be heated to brazing temperature and then cooled, but preferably the operation is carried out by passing the assembly through an appropriate heating element such as the circle torch indicated diagrammatically at 20 in Figure 3. As the assembly passes through the torch, each increment thereof is brought up to brazing temperature; and as it passes beyond the torch, the assembly is cooled and the bonding metal solidifies. Thereafter, the operation is completed by stretching the spring and removing it from the tube. If desired, an induction heating element can be substituted for the torch, or the tube can be heated by passing an electric current directly through the tube itself.

Figure 4 illustrates a suitable apparatus for inserting the spring and fins within the tube and for removing the spring therefrom after the brazing operation has been completed. This apparatus comprises a frame 25 supported on legs 26 and having a rod 27 anchored at one end as at 28. At the other end of the frame 25, there is a fluid pressure cylinder 30 having a piston 31 and piston rod 32. Piston rod 32 is provided with an eye 33 at its end, and rod 27 is provided with a similar eye 34 at its end nearest the eye 33. The coil spring 16 is hooked on the two hooks, and fluid pressure is supplied to the cylinder 30 through the conduit 36, the tube 10 having previously been slipped over the rod 27.

The action of the cylinder 30 stretches the spring 16 and reduces its diameter. The required number of fin members are then assembled around the circumference of the spring and held in place either manually or by an appropriate jig or fixture. Then, with the spring elongated and contracted, the tube 10 is slipped over the assembly of the spring 16 and fin members 11. The pressure in the hydraulic cylinder is then released, permitting the spring to contract longitudinally and expand diametrically to hold the fin members in firm engagement with the interior of the tube. If desired, the tube may be vibrated as the pressure in the cylinder is gradually released, so that the convolutions of the spring can better seat themselves against the inner edges of the fin members and urge the fin members outwardly against the inner surface of the tube. After the spring has contracted to its maximum extent, it is disconnected from the eyes 33 and 34, and the assembly is passed through the brazing apparatus.

After the brazing operation has been completed, if it is desired to remove the spring, the assembly is returned to the apparatus shown in Figure 5, the spring is hooked to the eyes 33 and 34, and the cylinder actuated to stretch the spring, so that it will be released from engagement with the inner edges of the fins. Then the tube is slid over the rod 27, and the spring is disconnected, and the tube is removed. The apparatus then is ready for another operation.

While ordinarily the spring will be removed and used again in a subsequent operation, in some cases it may be desirable to let the spring remain in place within the tube because the presence of the coil spring along the inner edges of the fins increases the turbulence of the flow of fluids within the tube and increases the rate of heat transfer of the tube. In such cases, the lugs 18 may be reduced in size so that they will not seriously impede the flow of fluid within the tube, or they may be eliminated entirely and separate jig means provided for positioning the fins.

It will be evident that various other means may be employed for holding the fins in place during the brazing operation. For example, expansible members such as shown in Figures 8 and 9 of our co-pending application Serial No. 488,586, filed of even date herewith, may be employed with lugs similar to the lugs 18 secured to the split rings to position the fin members properly. Figures 5 and 6 also illustrate an expansible and contractable member which is suitable for the present method, as well as for supporting the interior of a tube to which fins are to be welded in accordance with the method of our said co-pending application.

The member shown in Figures 5 and 6 comprises a series of coil springs 40 which are disposed around a tube 41. One end 42 of each spring is fixed within one of the recesses 43 in the wall of the tube 41, while the other end 45 of each spring extends through one of the longitudinal slots 46 in the tube wall. The ends 45 engage collars 47 which are mounted on a rod 48 disposed within the tube 41 and are slotted as at 49 to receive the ends 45. With this arrangement it will be evident that by moving the rod 48 and its associated collars 47 longitudinally with respect to the tube 41 (to the right in the drawing), all of the springs 40 can be elongated and diametrically contracted. In operation the springs are elongated by any suitable means, such as, for example, a screw or a fluid pressure cylinder acting between the tube 41 and the rod 48. The fins are positioned on the exterior of the spring, being guided by the projections 50 which are welded thereto and which correspond to the projections 18 in the previous form of the invention. The whole assembly is inserted within the tube to which the fins are to be brazed, and the springs are permitted to shorten and expand diametrically to retain the fin members in position against the interior surface of the tube wall. The brazing operation is then carried out as before, and the spring member is removed at the completion of the brazing operation by moving the rod 48 to the right with respect to the tube 41 to elongate the springs, contract them diametrically, and free them from their engagement with the fin members.

This type of apparatus is convenient for some purposes, particularly where the tube is of considerable length. The comparatively short springs 40 can act more or less independently of one another, since their ends 45 are simply engaged in slots 49 in the collars 47. Thus, the springs can seat themselves more or less individually and act somewhat independently of each other to urge the fin members constantly outwardly into engagement with the inner surface of the tube.

From the foregoing description, it will be evident that the invention provides a simple and effective method whereby fins can be brazed to the interior of tubes. The fins are held in place accurately during the brazing operation, and the resilient convolutions of the springs or other members employed to hold the fins in place constantly urge the fin members outwardly toward the tube. Because of the resilience of the convolutions, the fins are moved outwardly as the tube expands under the influence of heat and as their outward motion is permitted by the fusing of the brazing metal disposed between the fins and the interior surface of the tube. Thus, there is a following action which insures that the fin members will always be held in the required firm contact with the interior of the tube.

The method and apparatus produces tubes of highly advantageous character, the excellent bond provided insures good heat transfer between the fins and the tube wall, and the tubes produced by this method may also be provided with external fins, either transverse or longitudinal, by a simultaneous or a subsequent operation if so desired.

Those skilled in the art will appreciate that various changes and modifications can be made in the preferred forms of the invention disclosed herein without departing from the spirit and scope of the invention. The essential characteristics of the invention are defined in the appended claims.

We claim:

1. The method of making an internally finned tube which includes the steps of resiliently urging a plurality of longitudinally extending fin members outwardly into engagement with the inner surface of a tube by means separate from the fin members themselves, supplying bonding metal to the contacting surfaces of the fin members and the tube, and fusing the bonding metal while the fin members are so held, thereby brazing the fin members to the tube.

2. The method of making an internally finned tube which includes the steps of resiliently urging a plurality of longitudinally extending circumferentially spaced fin members outwardly into engagement with the inner surface of a tube by means of a plurality of convolutions of resilient metal engaging said fin members at spaced points along their length, supplying bonding metal to the contacting surfaces of the fin members and the tube, and fusing the bonding metal while the fin members are so held, thereby brazing the fin members to the tube.

3. The method of making an internally finned tube which includes the steps of supporting a plurality of longitudinally extending circumferentially spaced fin members having base portions and fin portions with their base portions against the interior of the tube by means of a coil spring extending longitudinally within the zone defined by the inner edges of the fin members and engaging said inner edges and brazing the members to the interior of the tube while they are so held.

4. The method of making an internally finned tube which includes the steps of supporting a plurality of longitudinally extending fin members having base portions and fin portions with their base portions against the interior of the tube and their fin portions extending inwardly therefrom and spaced from each other by means of a coil spring extending longitudinally within the zone defined by the inner edges of the fin portions and resiliently engaging said inner edges, brazing the members to the interior of the tube while they are supported by said spring, and thereafter reducing the diameter of said spring and removing it from the tube.

5. In the manufacture of tubing having separate longitudinally extending fin members brazed to the interior thereof, the steps of providing a plurality of fin members having base portions adapted to be brazed to the interior of a tube and fin portions extending from the base portions, tinning said base portions with a bonding metal, positioning said fin members along a series of convolutions with the fin members circumferentially spaced around the convolutions and the fin portions engaging the convolutions, said convolutions having a normal external diameter greater than the diameter of the circle defined by the inner edges of said fin portions of said fin members when the base portions thereof are in engagement with the inner surface of the tube, reducing the diameter of said convolutions, inserting the assembly of fin members and convolutions within the tube, permitting the convolutions to expand to resiliently urge the base portions of the fin members into engagement with the interior of the tube, and fusing the bonding metal to braze the bases of the fin members to the tube.

6. In the manufacture of tubing having separate longitudinally extending fin members brazed to the interior thereof, the steps of providing a plurality of fin members having base portions adapted to be brazed to the interior of a tube and fin portions extending from the base portions, tinning said base portions with a bonding metal, positioning said fin members along a coil spring with the fin members circumferentially spaced around the spring and the fin portions engaging the spring, said coil spring having, at the length it occupies during the operation of brazing the fin members to the tube, a normal external diameter greater than the diameter of the circle defined by the inner edges of said fin portions of said fin members when the base portions thereof are in engagement with the inner surface of the tube, holding the spring at an elongated length and reduced diameter, inserting the assembly of fin members and spring within the tube, shortening the spring to cause it to resiliently urge the fin members into engagement with the interior of the tube, and fusing the bonding metal to braze the bases of the fin members to the tube.

7. The method of making finned tubes which includes the steps of providing a supporting member which has the characteristic of diametrically contracting when its length is changed in one sense and diametrically expanding when its length is changed in the opposite sense, causing said member to diametrically contract, providing separate fin members each having a base portion and a fin portion, assembling a group of such fin members with said supporting member with the fin portions of each fin member engaging the exterior of the supporting member and extending generally longitudinally thereof, positioning said supporting member with the fin members assembled therewith within a tube when said supporting member is diametrically contracted, diametrically expanding said supporting member to cause it to urge said fin members outwardly into engagement with the inner surface of said tube, supplying bonding metal to the contracting surfaces of said fin members and said tube, and fusing the bonding metal to braze the fin members to the tube.

8. Apparatus for brazing a plurality of separately formed longitudinally extending fin members to the interior of a tube comprising a plurality of convolutions of resilient material which are adapted to change their diameter from a diameter such that they can readily be inserted in the tube with a plurality of fin members circumferentially spaced around them to a diameter such that they support the fin members against the inner surface of the tube, and means for heating the assembly of tube and fin members to brazing temperature while the fin members are being held in position by said convolutions simultaneously to braze said fin members to said tube.

9. Apparatus for brazing a plurality of longitudinally extending fin members to the internal surface of a tube comprising a member having a plurality of convolutions of resilient metal, which convolutions are adapted to change their diameter from a reduced diameter such that the member with fin members positioned around it can readily be inserted within the tube to an enlarged diameter such that the member resiliently supports the fin members against the internal surface of the tube, means for changing the diameter of the convolutions, and means for heating the assembly of tube and fin members to brazing temperature while the fin members are being held in position by said convolutions simultaneously to braze said fin members to said tube.

10. Apparatus according to claim 9 wherein guide lugs are secured to at least some of the convolutions for positioning fin members thereon.

11. Apparatus according to claim 9 wherein the member comprises a coil spring.

12. Apparatus according to claim 11 wherein the coil spring is provided with circumferentially spaced guide lugs for positioning fin members thereon.

13. Apparatus according to claim 9 wherein the member comprises a series of aligned coil springs, a guide member within the coil springs for maintaining them in substantial alignment, and means associated with the guide member for simultaneously varying the length of all of the springs in the series.

14. Apparatus according to claim 13 wherein the springs are provided with circumferentially spaced guide lugs for positioning fin members thereon.

15. Apparatus of the type described comprising a tubular guide member, a plurality of coil springs surrounding said guide member and fitting loosely thereon, one end of each spring being secured to said guide member, said guide member having a series of longitudinal slots, one slot being disposed adjacent the other free end of each spring, the free end of each spring extending through the adjacent slot, and an actuating rod disposed within said guide tube, said actuating rod having means to engage the free ends of the springs within the guide member, whereby all of the springs can be elongated simultaneously by moving the rod longitudinally with respect to the guide member.

16. Apparatus of the type described comprising a tubular guide member, a plurality of coil springs loosely fitting said guide member, one end of each spring being secured to said guide member, said guide member having a series of longitudinal slots, one slot being disposed adjacent the other free end of each spring, the free end of each spring extending through the adjacent slot, and an actuating member extending along said guide member, said actuating member engaging the free ends of the springs that project through said slots, whereby all of the springs can be elongated simultaneously by moving the actuating member longitudinally with respect to the guide member.

References Cited in the file of this patent

UNITED STATES PATENTS

| | | |
|---|---|---|
| 166,294 | Orum | Aug. 3, 1875 |
| 174,609 | Wright | Mar. 7, 1876 |
| 1,508,342 | Lee | Sept. 9, 1924 |
| 1,984,938 | Mason et al. | Dec. 18, 1934 |
| 2,473,633 | Brown | June 21, 1949 |
| 2,483,454 | Brown | Oct. 4, 1949 |
| 2,682,244 | Fortner | June 29, 1954 |
| 2,693,026 | Simpelaar | Nov. 2, 1954 |
| 2,703,921 | Brown | Mar. 15, 1955 |
| 2,718,864 | Fike | Sept. 27, 1955 |
| 2,731,709 | Gaddis et al. | Jan. 24, 1956 |
| 2,734,262 | Briegel | Feb. 14, 1956 |